United States Patent [19]

Young et al.

[11] Patent Number: 4,815,752
[45] Date of Patent: Mar. 28, 1989

[54] LIFT UNIT FOR WEIGHT DISTRIBUTING TRAILER HITCH

[75] Inventors: David A. Young, Plymouth; James L. Mellow, Birmingham, both of Mich.

[73] Assignee: The Fisher Group, Inc. (Draw-Tite Division), Canton, Mich.

[21] Appl. No.: 124,884

[22] Filed: Dec. 2, 1987

[51] Int. Cl.⁴ ............................................. B60D 1/14
[52] U.S. Cl. ................................... 280/406.2; 403/330
[58] Field of Search ........... 280/405 R, 406 R, 406 A, 280/407, 446 B, 452, 456 R, 483, 489, 488, 494, 507; 403/86, 106, 108, 321, 326, 130; 70/237

[56] References Cited

U.S. PATENT DOCUMENTS

| D. 213,616 | 3/1969 | Bock | 280/406 A |
|---|---|---|---|
| 2,546,206 | 3/1951 | Arehart | 280/406 A |
| 3,185,499 | 5/1965 | Reese | 280/483 |
| 3,497,240 | 2/1970 | Harms | 280/406 A |
| 3,679,232 | 7/1972 | Weber | 280/406 A |
| 3,756,618 | 9/1973 | Lewis | 280/489 |
| 3,778,088 | 12/1973 | Alexander | 280/406 A |
| 4,211,427 | 7/1980 | Young | 280/406 A |

FOREIGN PATENT DOCUMENTS

| 496626 | 9/1977 | Australia | 280/406 A |
|---|---|---|---|
| 115166 | 9/1969 | Denmark | 280/406 A |

Primary Examiner—David M. Mitchell
Assistant Examiner—Everett G. Diederiks, Jr.
Attorney, Agent, or Firm—Rhodes and Boller

[57] ABSTRACT

The lift unit comprises a bracket portion that is secured to the trailer tongue and a hinge portion that pivots on the bracket portion about a horizontal axis to raise and lower a chain for flexing and relaxing a spring bar that when flexed, serves to transfer a portion of the tongue weight to the towing vehicle. A flat rectangular member is eccentrically mounted on the side of the hinge portion to hang in the 6:00 o'clock position unless acted upon by influences other than gravity. When the hinge portion is operated to raise the chain and thereby flex the spring bar, a longer side of the rectangular member abuts and rides along the edge of a side of the bracket portion resulting in the member being swung clockwise to about the 8:00 o'clock position when full chain elevating position is reached. At this time one corner of the member drops into a notch in the bracket portion and prevents the hinge portion from being operated in the direction of chain lowering. The member is kept in this position by passing a tethered pin through the member and the hinge. When the pin is removed, the member can be swung further clockwise to about 4:00 o'clock to enable the chain to be lowered. The edge of the bracket's side acts on the member during chain lowering to swing the member counterclockwise back to 6:00 o'clock thereby automatically resetting the member for automatic locking when the chain is again raised.

19 Claims, 6 Drawing Sheets

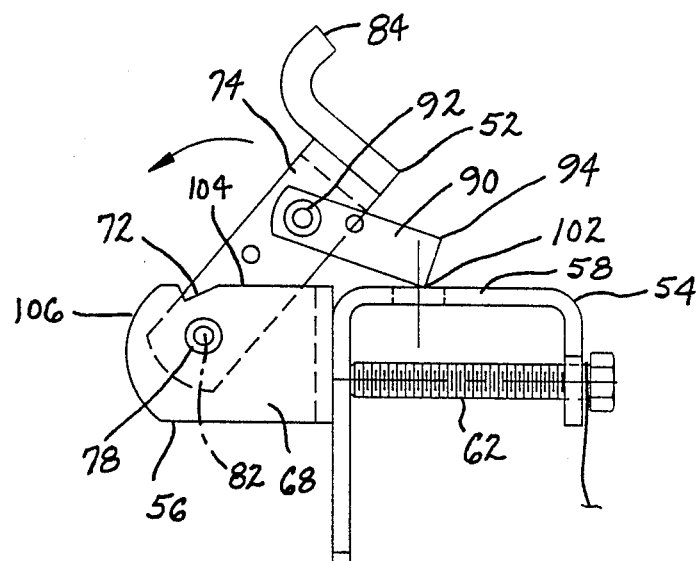
FIG. 4
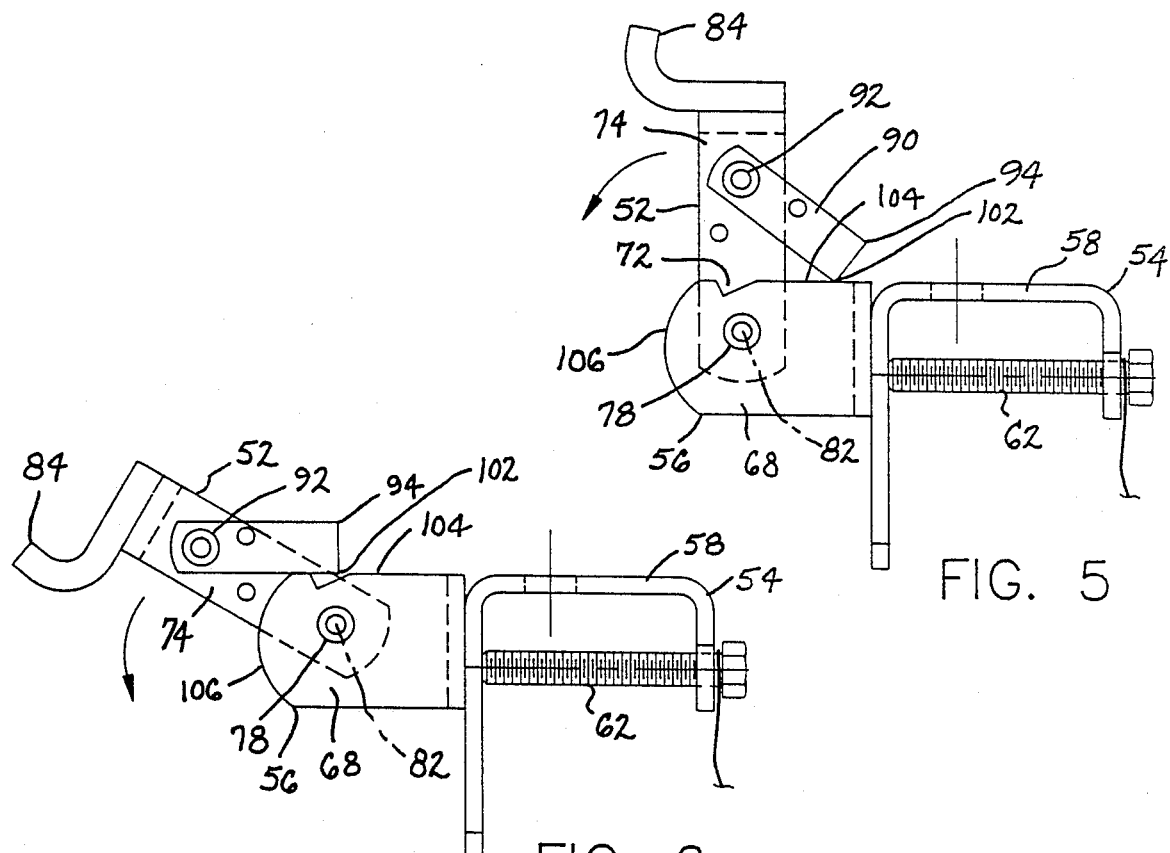
FIG. 5
FIG. 6

LIFT UNIT FOR WEIGHT DISTRIBUTING TRAILER HITCH

BACKGROUND AND SUMMARY OF THE INVENTION

This invention relates generally to weight distributing hitches of the type that are commonly used to couple a towed vehicle, such as a travel trailer, to an automotive towing vehicle, such as an automobile, truck, or van. More specifically, the invention relates to a new and improved lift unit for such a weight distributing hitch.

When a automotive vehicle is used to tow a trailer, an articulated joint coupling between the two is a virtual necessity. For a trailer that has a comparatively small tongue weight, a simple ball joint coupling is usually all that is necessary because the attachment of the trailer to the automotive vehicle will not concentrate an excessive downward force at the rear of the towing vehicle. However, for larger tongue weights, it is preferable to use a weight distributing hitch which can transfer the tongue weight to the towing vehicle in a manner which disributes the weight more forwardly on the towing vehicle.

Various embodiments of weight distributing hitches have been proposed over the years, and a number of them have enjoyed significant commercial usage. Examples are shown in various expired U.S. patents to Reese and Mathisen. While these weight distributing hitches contain a ball joint coupling that provides the basic articulation, they also include a weight-distributing platform that attaches to the towing vehicle and spring bars that are disposed to each side of the ball joint coupling and flexed between the towing and towed vehicles in a manner that transfers a portion of the tongue weight directly to the weight distributing platform so that the full tongue weight is not imposed on the ball joint coupling.

A representative spring bar has its forward end removably fitted in a pivot joint connection disposed to the side of the ball so that the spring bar can swing generally horizontally to follow articulation of the ball joint coupling whenever the towing vehicle makes a turn. The spring bar extends generally rearwardly in an underlying relationship to one side of the trailer tongue. Flexing of the spring bar is accomplished by elevating its rearward end upwardly toward the tongue through the use of a lift bracket that is mounted on the tongue's side a certain distance rearwardly of the ball joint coupling. A length of chain is commonly used to transmit the motion of the lift unit to the spring bar.

In one type of weight distributing hitch the spring bars are connected directly to their lift units so that operation of the lift units to elevate the chains pulls directly on the rearward ends of the spring bars. In another type of weight distributing hitch, the lower end of the chain is attached to the trailing end of a lever whose forward end is pivoted about a generally horizontal axis at a location on the side of the tongue that is between the ball joint coupling and the lift unit. The rear of spring bar is supported by the rear of this lever so that when the rear of the lever is elevated by the chain, the rear of the lever will lift the rear of the spring bar along with it thereby flexing the spring bar.

Various embodiments of lift units are illustrated in prior patents. One type of lift unit comprises a bracket portion that mounts on the trailer tongue and provides a generally horizontal hinge axis for a hinge portion of the lift unit. This hinge portion of the lift unit contains a suitable means for connection of the chain, such as a hook onto which a link of the chain can be inserted, and a suitable means for engagement by a removable tool that is used as a lever to rotate the hinge portion about the hinge axis for raising and lowering the chain. Typically, the hinge portion is constructed and arranged in relation to the line of action of the force that is applied through the chain so that as the chain is elevated over a final increment of travel to raised position, the hinge portion goes slightly over center and is stopped by abutment with the bracket portion. In this way, the force of the flexed spring bar that is transmitted through the chain to the hinge portion of the lift unit will tend to keep the hinge portion in its stopped abutment with the bracket portion. In general, it is desirable to provide a means for releasably locking the hinge portion in this over center position and removable locking pins, or the like, are typically employed for this purpose. Accordingly, such a lift unit will have suitable holes in its bracket and hinge portions which align with each other when the hinge portion is brought to the over center position. The pin is passed through the aligned holes to thereby constrain the hinge portion against rotation on the bracket portion. These pins are suitably shaped to provide for convenient attachment and removal without the use of separate tools, and yet are designed to remain in place during typical over-the-road travel that will be encountered when the trailer is towed by the automotive vehicle.

The present invention relates to a new and improved mechanism for automatically locking the hinge portion of the lift unit to the bracket portion of lift unit as the hinge portion is swung to a position that completes the elevation of the chain. The disclosed embodiment comprises a locking member mounted on the hinge portion that operates by force of gravity to engage a catch in the bracket portion to perform the locking function. When it is desired to lower the chain, the locking member is manually disengaged from the catch, enabling the hinge portion to be operated to lower the chain. Moreover, operation of the hinge portion to full chain lowering position brings the hinge portion to a condition where the locking member automatically resets itself so that subsequent operation of the hinge portion to elevate the chain will again cause the locking member to automatically lock the hinge portion to the bracket portion as the hinge portion once again comes to the full chain elevating position.

In order to assure that accidental disengagement of the locking element from the catch will not occur when the hinge portion is locked in the full chain elevating position, both the locking member and the hinge portion are provided with holes that align with each other when the hinge portion is in full chain elevating position and the locking member is engaged with the catch. A tethered pin is removably inserted through these aligned holes to prevent the locking member from being disengaged from the catch. Removal of the pin enables the locking member to be disengaged from the catch for subsequent lowering of the chain in the aforementioned manner.

The automatic locking feature of the present invention is embodied with comparatively few and simple parts. The catch is incorporated as a notch into the design of the bracket portion. The locking member is a flat metal part that is connected by a pivot pin to the side of the hinge portion The foregoing features, advantages and benefits of the invention, along with the additional ones, will be seen in the ensuing description and claims which should be considered in conjunction with the accompanying drawings. The drawings disclose a presently preferred embodiment of the invention in exemplary usage, according to the best mode contemplated at the present time in carrying out the invention.

BRIEF DESCRIPTION OF THE DRAWINGS

FIG. 4 is a view similar to FIG. 3 with the locking member having been unpinned and displaced from locking position in anticipation of chain lowering.

FIG. 5 is a view illustrating the relationship of the several parts of the lift unit during an initial portion of the chain lowering operation.

FIG. 6 is a view similar to FIG. 5 illustrating the relationship of the several parts as the chain is further lowered.

DESCRIPTION OF THE PREFERRED EMBODIMENT

Figure 1:
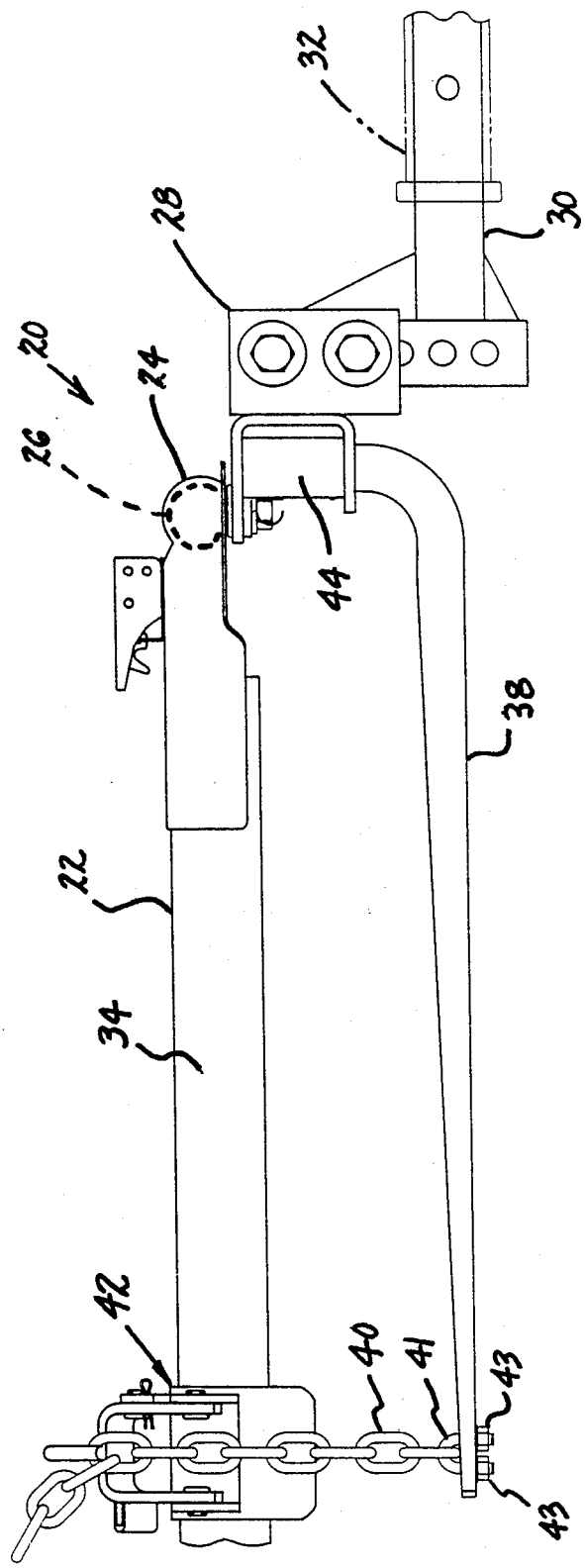
FIG. 1 is a partial side elevational view of one form of weight distributing hitch containing the novel lift unit of the present invention.
Figure 2:
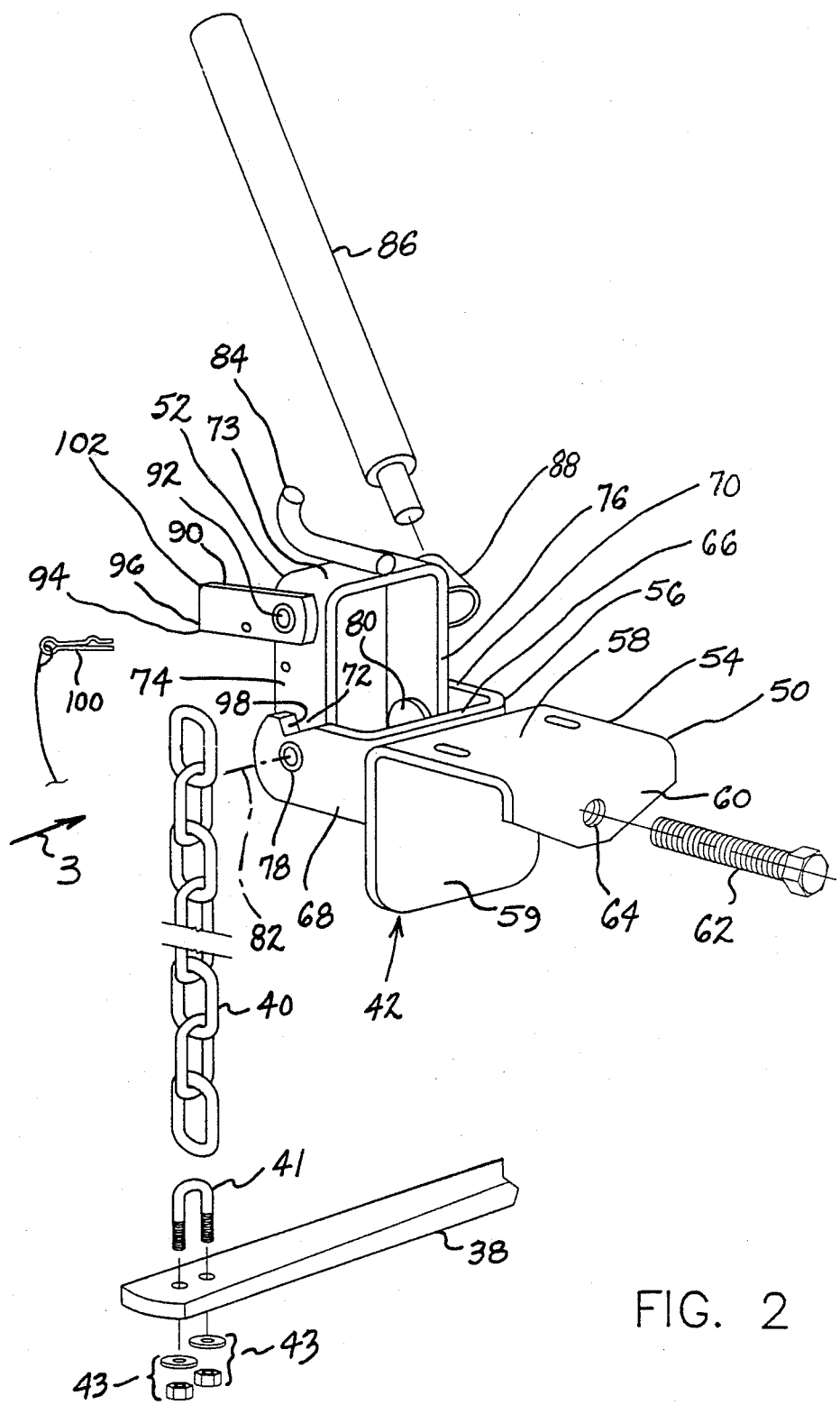
FIG. 2 is an exploded perspective view that includes the lift unit of the present invention.

FIG. 1 shows a hitch assembly 20 for coupling a towing vehicle, such as an automobile, van, or truck, with a towed vehicle, such as a travel trailer. The towed vehicle comprises a tongue 22 having a coupling 24 at its forward end that is releasably engaged with a towing ball 26 that is part of an assembly 28 mounted on the towing vehicle.

Assembly 28 comprises a bar 30 of square cross section that is inserted into a receiver 32 of similar cross section that is part of a weight distributing frame (not shown) suitably attached to the undercarriage of the towing vehicle. The connection of coupling 24 with ball 26 forms an articulated joint between the towing vehicles that is located midway between the vehicles' sides.

Trailer tongue 22 comprises a pair of members 34, typically rectangular or channel shaped, that extend from laterally spaced locations of the towed vehicle's frame forwardly toward convergence with each other. Coupling 24 is disposed proximate the converging ends of members 34. Hence in FIG. 1, only the right side portion of the hitch assembly can be seen, and it is to be appreciated that the view from the left side is analogous.

FIG. 1 further shows a spring bar 38 that has a forward end connected to assembly 28 and a rearward end that is connected to the right member 34 by means of a chain 40 and a lift unit assembly 42. The lower end of chain 40 attaches to the rear of spring bar 38 by a U-bolt 41 and locking fastener arrangements 43. The forward end of spring bar 38 has a circular cylindrical shape that is received in a generally vertical circular cylindrical socket 44 provided in assembly 28 just to the right of ball 26. This connection of the forward end of the spring bar to assembly 28 enables the spring bar to move in a generally horizontal arc about the axis of socket 44, yet to be flexed in a generally cantilever fashion by the upward force exerted on its rear end by the action of chain 40 and lift unit assembly 42. In this way, the spring bar is rendered compatible with the basic articulation provided by ball 26 and coupling 24 while transferring a portion of the tongue weight to the towing vehicle.

This much of the description of FIG. 1 is mainly by way of background since the inventive features reside in the lift unit assembly itself. Attention is therefore now focused upon the remaining drawing FIGS. 2-10.

Lift unit assembly 42 comprises a bracket portion 50 and a hinge portion 52. Bracket portion 50 is fabricated from two stamped metal parts 54, 56 of suitable thickness that are joined together. Part 54 comprises a top 58, a longer side 59 and a shorter side 60, and is designed to fit closely over the top of member 34 with the longer side 59 disposed against the outboard side of member 34 and the shorter side 60 facing the inboard side. The bracket portion 50 is locked in place on member 34 by means of a screw 62 that is threaded into a threaded hole 64 centrally located in the shorter side 60 and tightened against the inboard side of member 34.

Part 56 has a general U-shape that comprises a base 66 disposed against and welded to side 59 of part 54. A pair of sides 68, 70 extend from the opposite ends of base 66. Sides 68, 70 are generally identical in shape except that the top surface of side 68 contains a notch 72 whose purpose will become more apparent from the ensuing description later on.

Hinge portion 52 comprises a stamped metal piece of suitable thickness that is formed into a general U-shape. It has a base 73 from which extend sides 74, 76. The outside dimension across sides 74, 76 is just slightly less than the inside dimension across sides 68 and 70 of part 56, enabling the distal end portions of the sides of the hinge portion to fit closely inside the sides of bracket part 56. The distal end portions of the two sides 68, 70 and the distal end portions of the two sides 74, 76 contain aligned circular holes. Circular cylindrical pivot pins 78 and 80 through the respective aligned holes provide a generally horizontal axis of pivoting 82 for the hinge portion about the bracket portion.

A hook 84 formed from a short circular bar is welded centrally to base 73 of hinge portion 52 in the manner shown. This hook is used for attachment of chain 40 to the lift unit. Because the flexing of the spring bar by the lift unit imposes a substantial tension force through the chain, pivoting of the hinge portion of the lift unit is facilitated by use of an external tool 86 that functions as a lever. The illustrated embodiment of lift unit comprises a U-shaped metal bracket 88 of suitable thickness welded to the side 76 of hinge portion 52 in the manner shown to provide a socket into which one end of tool 86 can be inserted for rotating the hinge portion about axis 82 to raise and lower the chain.

The other side 74 of hinge portion 52 contains a gravity-responsive locking member 90 that co-acts with notch 72 to perform the function of keeping the hinge portion in the full chain elevating position. The gravity-responsive member is preferably a flat metal part of generally rectangular shape and whose thickness is substantially the same as the thickness of part 56. The gravity-responsive feature is created by mounting member 90 eccentrically on the outer face of side 74. The eccentric mounting is achieved by pivoting the member near one of its ends by means of a circular cylindrical pivot pin 92 that passes through aligned circular holes in both the member and side 74. In this way, the member will tend to hang and remain in the 6:00 o'clock position by force of gravity (see FIGS. 9 and 10) unless displaced by some other influence, such as interaction with the side 68 of bracket part 56.

Figure 3:
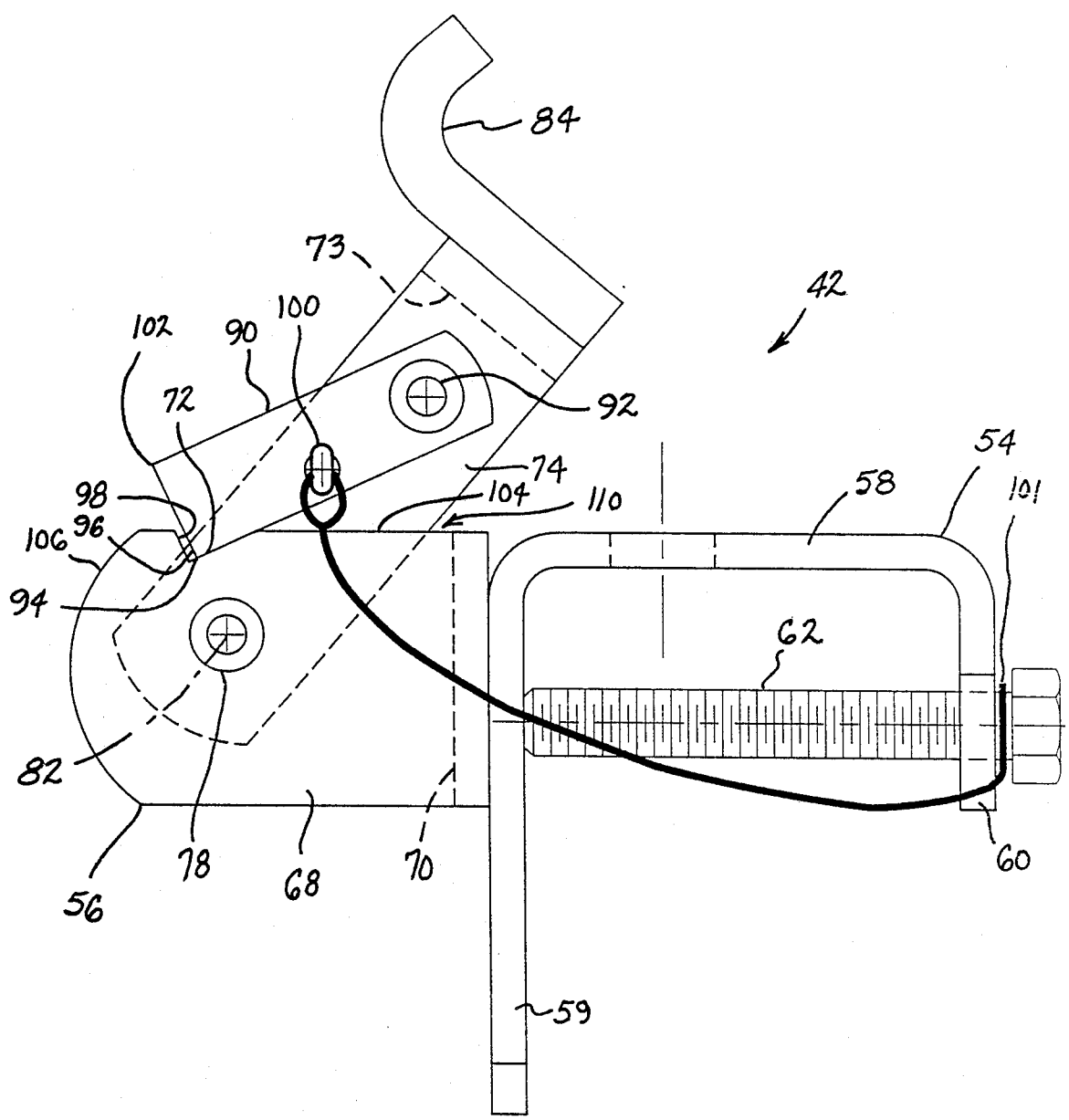
FIG. 3 is a view of the lift unit taken generally in the direction of arrow 3 in FIG. 2 but illustrating the parts in assembled relationship with the lift unit in full chain elevating position and with the locking member pinned in locking position.

FIG. 3 shows the lift unit in full chain elevating position with member 90 displaced approximately to the 8:00 o'clock position where its right angled corner 94 has dropped into notch 72. Any attempt to displace the hinge part in the counterclockwise sense, as viewed in FIG. 3, from the full chain elevating position will result in the end side 96 of corner 94 abutting the confronting surface 98 of notch 72. Such abutment will prevent any further counterclockwise motion thereby keeping the hinge portion in substantially the full chain elevating position.

In order to guard against the accidental or unintentional displacement of member 90 from the locking position shown in FIG. 3, a tethered locking pin 100 may be employed. In the position of FIG. 3, the locking pin passes through a pair of aligned holes in member 90 and the side 74 of hinge part 52. A suitable pin 100 may be in the form of a cotter pin, as shown, which can be inserted and removed without the use of any separate tools. The tethering of the pin is advantageous in preventing the pin from accidentally falling on the ground or becoming separated and misplaced.

An advantageous manner for tethering pin 100 is by providing at the end of the tether opposite the pin, a closed loop 101 whose size is slightly greater than that of the shank diameter of screw 62 but smaller than the screw's head. The loop is disposed onto the screw shank prior to fastening of the screw to the bracket portion 50 so that the installed position is as seen in FIG. 3. Alternatively, the loop could be placed on the free end of the screw shank after the screw has been run into the bracket, but before tightening against member 34 so that in the installed position the loop is disposed on the opposite side of side 60 from that shown in FIG. 3.

Operation of the lift unit to lower the chain and thereby allow the spring bar to relax is described with reference to FIGS. 3–9.

The first step in lowering the chain is to unpin member 90 from side 74 of hinge part 52 by removing pin 100. Once the pin has been removed, member 90 is swung in the clockwise sense from the FIG. 3 to the FIG. 4 position. In the FIG. 4 position, the corner 102 that is immediately adjacent corner 94 rests on top 58 of bracket part 54 and the member 90 is about at the 4:00 o'clock position.

Use of tool 86 to rotate hinge portion 52 in the counterclockwise sense about axis 82 from the FIG. 4 to the FIG. 5 position will result in corner 102 of locking member 90 riding across top 58 and onto the horizontal top edge surface 104 of side 68. During this time, the locking member swings clockwise toward the 5:00 o'clock position. The path of motion that is described by pivot pin 92 about axis 82 is a circular arc. When the hinge sides 74, 76 are vertical (i.e. at 12:00 o'clock), pin 92 is approximately over axis 82 and locking member 90 is approximately at the 4:30 position.

While continued rotation of the hinge portion from this point results in corner 102 riding across edge surface 104, locking member 90 now begins to swing counterclockwise. At the 3:00 o'clock position of the locking member, the longer side that is contiguous with corner 102 is resting on the top edge surface of side 68 just before the beginning of the rounded distal end edge 106 of side 68 (see FIG. 6). It is to be noted that the locking member is fully clear of notch 72 at this time.

Figure 7:
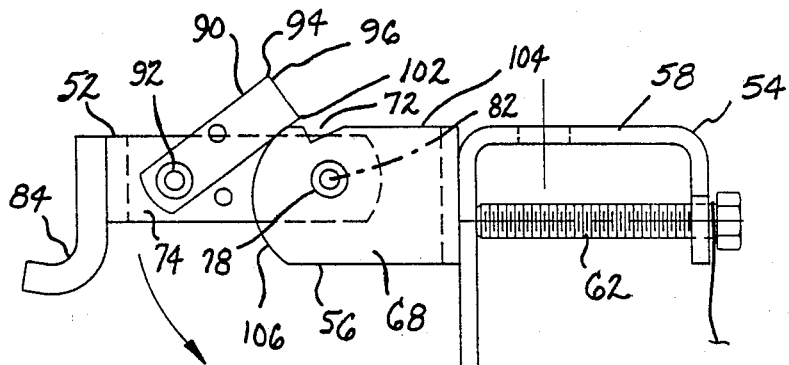
FIG. 7 is a view similar to FIG. 6 illustrating the relationship of the several parts as the chain is still further lowered.
Figure 8:
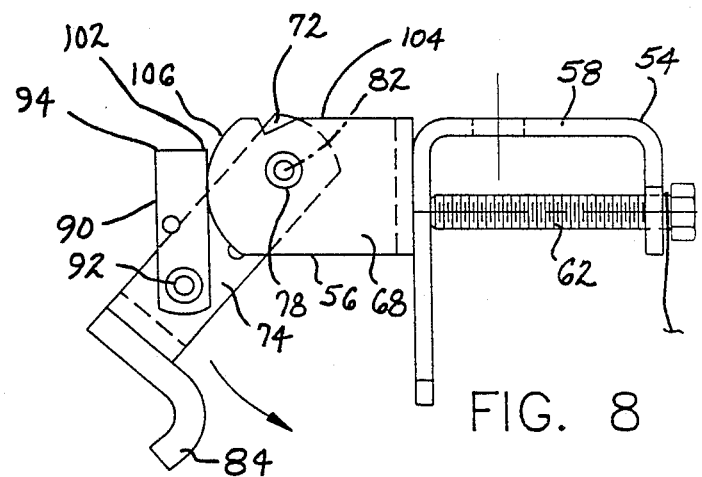
FIG. 8 is a view similar to FIG. 7 illustrating the relationship of the several parts in almost the full chain lowering position.

Continued rotation of the hinge portion results in an interaction between the rounded end edge 106 and the locking member 90 which continues rotating the locking member counterclockwise toward the 12:00 o'clock position. FIG. 7 shows that when the hinge sides are at 9:00 o'clock, the locking member is about at 2:00 o'clock.

Attainment of the 12:00 o'clock position for locking member 90 occurs when the hinge has been swung approximately 135° from vertical to about 7:30 o'clock. This is portrayed in FIG. 8. Continued rotation will result in the locking member being urged toward the 11:00 o'clock position, and because it is freely pivoted on the side of the hinge portion, the locking member will freely swing counterclockwise to assume the 6:00 o'clock position shown in FIG. 9 as the hinge is swung slightly more counterclockwise from the FIG. 8 position.

Figure 9:
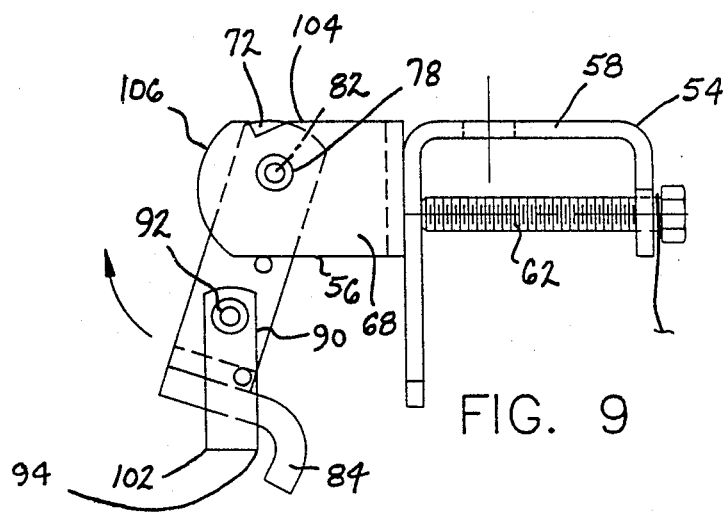
FIG. 9 is a view similar to FIG. 8 illustrating the relationship of the several parts in full chain lowering position.

From the above description, it can be appreciated that the rounded distal end edge 106 of side 68 of the bracket part 56 acts as a cam for resetting the locking member to the 6:00 o'clock position as the chain is lowered to full chain lowered position, represented by FIG. 9.

Figure 10:
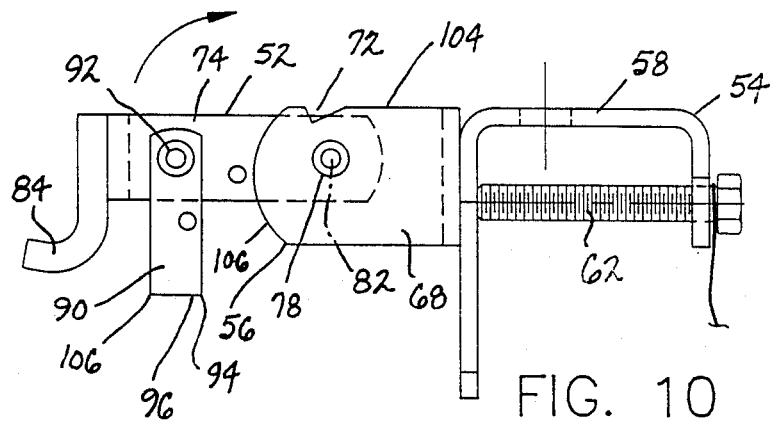
FIG. 10 is a view illustrating the relationship of the several parts during an initial portion of the chain elevating operation from the fully lowered position.
Figure 11:
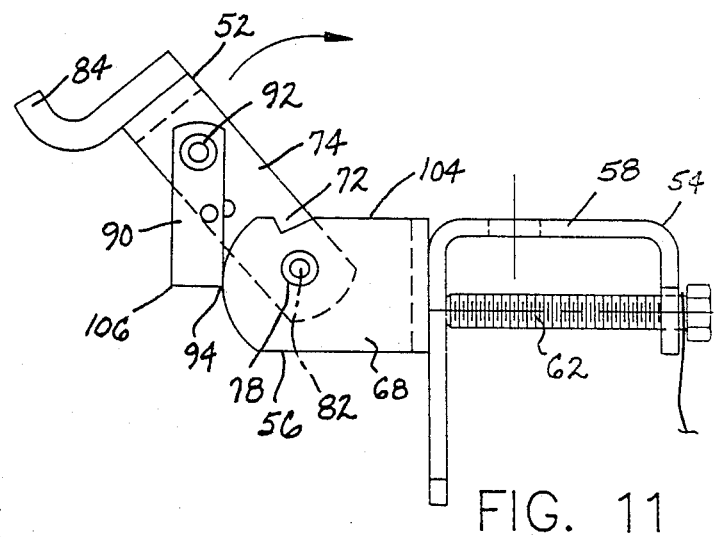
FIG. 11 is a view similar to FIG. 10 illustrating the relationship of the several parts at a further point in the elevation of the chain.
Figure 12:
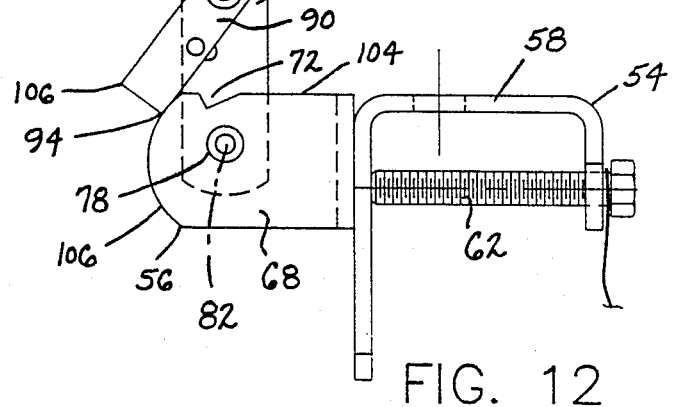
FIG. 12 is a view similar to FIG. 11 illustrating the relationship of the several parts at a still further point in the elevation of the chain.

If the lift unit is now operated in the clockwise sense from the position of FIG. 9 to elevate the chain, the sequence portrayed by FIGS. 10–12 occurs. The locking member remains pendent in the 6:00 o'clock position as the hinge portion is swung through the 9:00 o'clock position of FIG. 10 to about the 10:30 o'clock position of FIG. 11. At this time, the long side of member 90 that is contiguous with corner 94 begins to abut the rounded end edge 106 of the bracket side.

Continued rotation of the hinge portion will result in this side of member 90 continuing to ride along edge 106 with the result that the locking member is rotated increasingly clockwise from the 6:00 o'clock position toward about the 8:00 o'clock position. FIG. 12 shows the hinge in the 12:00 o'clock position and member 90 in about the 7:00 o'clock position.

As the hinge portion comes to essentially full chain elevating position, which is approximately 45° to the right of vertical as viewed in the drawing figures (i.e. about 1:30 o'clock), corner 94 of the locking member drops off the end of edge 106 and into notch 72. Just prior to this, the hinge goes over center with respect to the chain so that the force which is exerted by the chain is in a sense which will continue to urge the hinge in the clockwise direction as viewed in the drawing figures. This actually results in a small increment of over center travel that is arrested by the hinge portion abutting the bracket portion in approximately the location indicated by the arrow 110 in FIG. 3. In this way the usual chain force does not seek to swing the hinge counterclockwise. If for any reason an attempt is made to force the hinge portion in the counterclockwise direction, the action of the locking member with the notch will resist rotation, even for substantial forces. When the lift unit has been brought to the full chain elevating position with the locking member automatically locking the hinge portion to the bracket portion in the manner described, pin 100 is re-inserted through the aligned holes in the hinge portion and the locking member as described earlier. FIG. 3 shows a slight clearance provided between the end of the locking member and the shorter side of the notch to allow the member to be freely swung out of the notch in the aforedescribed manner preparatory to chain lowering.

Specific design details for a lift unit are defined in accordance with conventional engineering principles. While a preferred embodiment of the invention has been illustrated and described, it will be appreciated that principles may be implemented in other equivalent embodiments and, as also explained earlier, a lift unit embodying principles of the invention may be used with various types of weight distributing hitches.

What is claimed is:

1. In a weight distributing hitch for coupling a towing vehicle with the tongue of a towed vehicle and which comprises a main articulated coupling to provide the basic articulation between the towing and towed vehicles and weight distributing means for transmitting a portion of the tongue weight of the towed vehicle to the towing vehcile so that the full tongue weight is not imposed on the articulated coupling, said weight distributing means comprising a spring bar that is flexed to transmit some of the tongue weight to the towing vehicle by means of a lift unit that is mounted on the tongue of the towed vehicle, said lift unit comprising a bracket portion that mounts on the tongue of the towed vehicle and a hinge portion that is rotatable on said bracket portion about an axis and that is operable coupled with the spring bar for raising and lowering the spring bar to flex and relax the same, the improvement which comprises means for automatically locking the hinge portion in the position assumed upon attainment of a desired degree of flexing of the spring bar comprising gravity-responsive locking means carried by said hinge portion and operable by force of gravity upon said hinge portion having been operated in one sense about said axis to attain the desired degree of spring bar flexing to engage said bracket portion and constrain the hinge portion against operation in the opposite sense that would relax the spring bar.

2. The improvement set forth in claim 1 in which said gravity-responsive locking means comprises a locking member that is pivotally mounted on said hinge portion in an eccentric manner.

3. The improvement set forth in claim 2 in which said locking member is a flat, generally rectangular shaped element that is pivotally mounted toward one of its lengthwise ends so that it tends to respond to gravity by hanging vertically in the 6:00 o'clock position.

4. The improvement set forth in claim 2 including a further locking means for locking said locking member to said hinge portion when the locking member is locking the hinge portion in the position that is assumed by the hinge portion upon attainment of the desired degree of flexing of the spring bar.

5. The improvement set forth in claim 1 in which said axis is generally horizontal, and said bracket portion comprises a catch portion with which said gravity-responsive locking means coacts to constrain the hinge portion against operation in the opposite sense that would relax the spring bar.

6. The improvement set forth in claim 5 in which said catch portion is a notch and said gravity-responsive locking means has a corner that drops into the notch by force of gravity acting upon the gravity-responsive locking means when the hinge portion has been brought to the position that attains the desired degree of flexing of the spring bar.

7. The improvement set forth in claim 5 in which said gravity-responsive locking means is disengageable from said catch portion, thereby enabling the hinge portion, when so disengaged from the catch portion, to be operated in said opposite sense to relax the spring bar free of interference between said gravity-responsive locking means and said catch portion.

8. The improvement set forth in claim 7 in which said bracket portion comprises means interacting with said gravity-responsive locking means during operation of the lift unit in said opposite sense to relax the spring bar for automatically resetting said gravity-responsive locking means when a desired degree of relaxation of the spring bar has been attained for thereby automatically resetting said gravity-responsive locking means for subsequent automatic coaction with said catch portion to constrain the hinge portion against operation in said opposite sense upon a subsequent operation of the hinge portion to the position that attains the desired degree of flexing of the spring bar.

9. The improvement set forth in claim 8 in which said means for automatically resetting said gravity-responsive locking means comprises a curved edge surface on said bracket portion across which said gravity-responsive locking means rides during a segment of the hinge portion travel as the hinge portion approaches the position which attains the desired degree of spring bar relaxation.

10. The improvement set forth in claim 1 in which said lift unit is organized and arranged such that said hinge portion goes over center as it attains the desired degree of flexing of the spring bar and said gravity-responsive locking means acts automatically by force of gravity to constrain the hinge portion against operation in said opposite sense just after the hinge portion has gone over center.

11. The improvement set forth in claim 1 in which said gravity-responsive locking means is eccentrically mounted on said hinge portion to hange free by force of gravity in the 6:00 o'clock position, and during operation of the lift unit to flex the spring bar to the desired degree of flexing, said gravity-responsive locking means is caused to swing from the 6:00 o'clock position in a clockwise sense to assume a position that is more clockwise than 6:00 o'clock but less clockwise than 9:00 o'clock.

12. The improvement set forth in claim 11 in which said hinge portion is organized and arranged to go over center as it comes to the position that attains the desired degree of flexing of the spring bar, and said gravity-responsive locking means is organized and arranged such that with said hinge portion in the last-mentioned position, said gravity-responsive locking means can be freely rotated in the clockwise sense to a position beyond the 12:00 o'clock position that does not constrain subsequent operation of the hinge portion in said opposite sense to relax the spring bar.

13. The improvement set forth in claim 12 in which said gravity-responsive means is organized and arranged to remain in the position beyond the 12:00 o'clock position preparatory to operation of the hinge portion in said opposite sense to relax the spring bar, to rotate counterclockwise beyond 12:00 o'clock during a segment of the operation of the hinge portion in said opposite sense to relax the spring bar, and as the hinge portion approaches a position that attains the desired degree of relaxation of the spring bar, to swing freely by force of gravity still further counterclockwise from the 12:00 o'clock position to return to the 6:00 o'clock position and thereby automatically be reset for subsequent coaction with the hinge portion to constrain same against operation in said opposite sense when the hinge portion is again operated to attain the desired degree of flexing of the spring bar.

14. The improvement set forth in claim 1 in which said gravity-responsive locking means is a flat generally rectangular element that is eccentrically pivoted on a side of said hinge portion to hang at 6:00 o'clock by force of gravity, said bracket portion having a side with which said element interacts, said side having a top edge and an end edge, said end edge having a shape that interacts with said element and said top edge having a notch, said element being disposed on said hinge portion side in relation to said end edge and top edges such that during operation of the hinge portion to flex the spring bar, said element is engaged by said end and pivoted in the clockwise sense from the 6:00 o'clock position to a position that is between 6:00 and 9:00 o'clock as said hinge portion attains the desired degree of flexing of the spring bar and immediately thereupon said element falls off said end edge and into said notch thereby constraining the hinge portion against operation in said opposite sense that would relax the spring bar, said element being free for swinging out of the notch in the clockwise sense to a position that is between the 3:00 and 6:00 o'clock positions in anticipation of operation of the hinge portion to relax the spring bar, and upon such operation of the hinge portion to relax the spring bar, said element rides across said top edge, clearing said notch, and across a portion of said end edge, the interaction of said end edge with said element during operation of the hinge portion to relax the spring bar causing said element to be pivoted in the counterclockwise sense beyond the 12:00 o'clock position so that by force of gravity, said element pivots further counterclockwise to assume the 6:00 o'clock position upon attainment of the desired relaxation of the spring bar and thereby be automatically reset for subsequently constraining the hinge portion against operation in said opposite sense when the hinge portion is again operated to attain the desired degree of flexing of the spring bar.

15. In a weight distributing hitch for coupling a towing vehicle with the tongue of a towed vehicle and which comprises a main articulated coupling to provide the basic articulation between the towing and towed vehicles and weight distributing means for transmitting a portion of the tongue weight of the towed vehicle to the towing vehicle so that the full tongue weight is not imposed on the articulated coupling, said weight distributing means comprising a spring bar that is flexed to transmit some of the tongue weight to the towing vehicle by means of a lift unit that is mounted on the tongue of the towed vehicle, said lift unit comprising a hinge portion that is rotatable about an axis on a bracket portion and operably coupled with the spring bar for raising and lowering the spring bar to flex and relax the same, the improvement which comprises locking means carried by the hinge portion and engagageable with said bracket portion for locking the hinge portion to the bracket portion upon attainment of a desired degree of flexing of the spring bar and further locking means separably engaged with both said first-mentioned locking means and said hinge portion for separably locking the first-mentioned locking means to the hinge portion when the first-mentioned locking means is locking the hinge portion to the bracket portion.

16. The improvement set forth in claim 15 in which said first-mentioned locking means comprises an element pivotally mounted on said hinge portion and said further locking means comprises an element that is passed through aligned holes in said first-mentioned locking means and said hinge portion.

17. The improvement set forth in claim 16 in which said bracket portion is secured on the tongue of the towed vehicle by a screw having a shank threaded into a threaded hole in said bracket portion and tightened against the tongue, and including a tether that tethers said element of said further locking means to said lift unit, said tether comprising a loop through which the screw shank is passed, thereby tethering said element of said further locking means on the screw's shank.

18. In a weight distributing hitch for coupling a towing vehicle with the tongue of a towed vehicle and which comprises a main articulated coupling to provide the basic articulation between the towing and towed vehicles and weight distributing means for transmitting a portion of the tongue weight of the towed vehicle to the towing vehicle so that the full tongue weight is not imposed on the articulated coupling, said weight distributing means comprising a spring bar that is flexed to transmit some of the tongue weight to the towing vehicle by means of a hinge that is mounted on the tongue of the towed vehicle for pivotal motion about an axis, said hinge being operably coupled with the spring bar to flex and relax the same, the improvement which comprises a catch disposed on the tongue of the towed vehicle adjacent the path of motion of the hinge about said axis, and means for automatically locking the hinge in the position assumed upon attainment of a desired degree of flexing of the spring bar comprising gravity-responsive locking means carried by said hinge and operable by force of gravity upon said hinge having been operated in one sense about said axis to attain the desired degree of spring bar flexing to engage said catch and constrain the hinge against operation in the opposite sense that would relax the spring bar.

19. In a weight distributing hitch for coupling a towing vehicle with the tongue of a towed vehicle and which comprises a main articulated coupling to provide the basic articulation between the towing and towed vehicles and weight distributing means for transmitting a portion of the tongue weight of the towed vehicle to the towing vehicle so that the full tongue weight is not imposed on the articulated coupling, said weight distributing means comprising a spring bar that is flexed to transmit some of the tongue weight to the towing vehicle by means of a hinge that is mounted on the tongue of the towed vehicle for pivotal motion about an axis, said hinge being operably coupled with spring bar for raising and lowering the spring bar to flex and relax the same, the improvement which comprises a catch disposed on the tongue of the towed vehicle adjacent the path of motion of the hinge about said axis, and locking means carried by the hinge and engageable with said catch for locking the hinge to the catch upon attainment of a desired degree of flexing of the spring bar and further locking means separably engaged with both said first-mentioned locking means and said hinge for separably locking the first-mentioned locking means to the hinge when the first-mentioned locking means is locking the hinge to the catch.

* * * * *